United States Patent Office 3,464,407
Patented Sept. 2, 1969

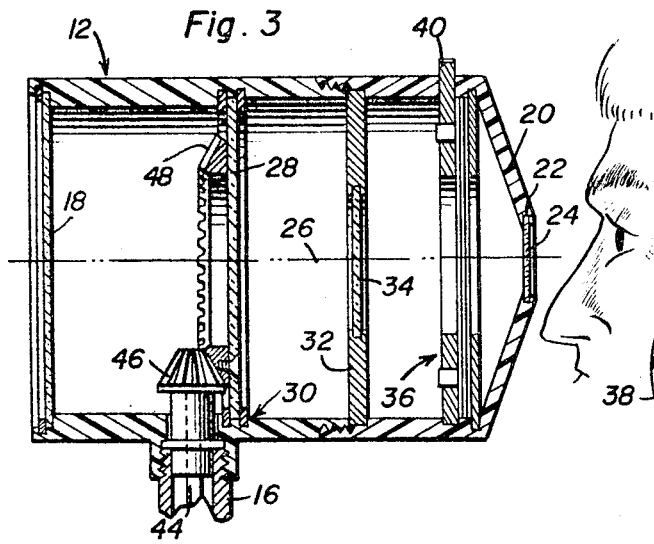
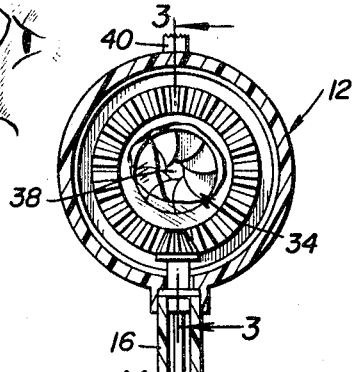
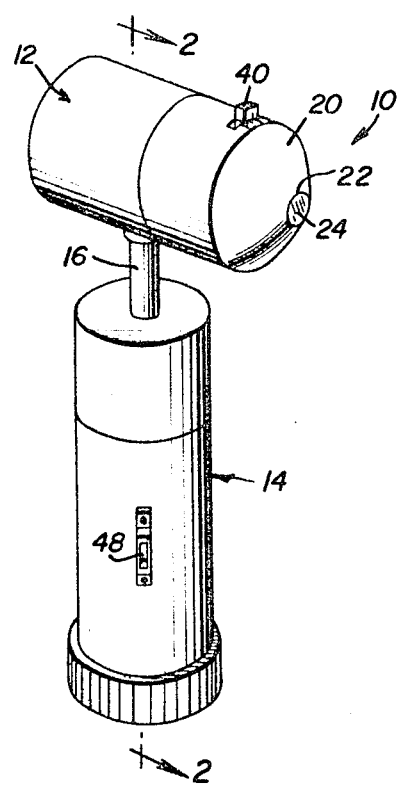
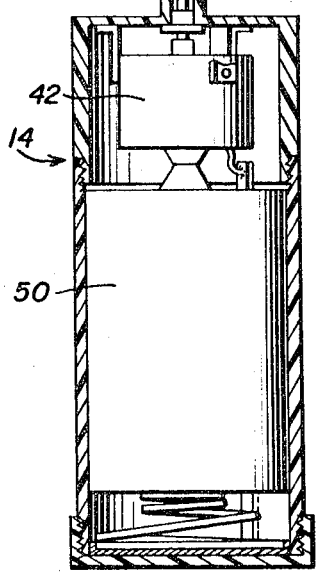
Dean W. Larson
Josephine L. Rinaldi
INVENTORS

3,464,407
DIAGNOSTIC AND THERAPEUTIC INSTRUMENT FOR DISORDERS OF THE EYES
Dean W. Larson, 1000 E. Alosta, Citrus Gardens, Apt. 39, Azusa, Calif. 91702, and Josephine L. Rinaldi, New Orleans, La. (3030 Edenboro Ave., Apt. 106, Metairie, La. 70002)
Filed Jan. 21, 1966, Ser. No. 522,201
Int. Cl. A61h 5/00
U.S. Cl. 128—76.5     7 Claims

ABSTRACT OF THE DISCLOSURE

A monocular instrument for diagnosing and treating certain eye disorders by use of the rotating Haidinger brush phenomenon. A tubular housing fixed to a handle rotatably mounts a polarizing filter in axially spaced relation to a stationary blue-violet filter aligned with an adjustable iris and a viewing aperture at one closed end of the housing. The polarizing filter is rotated by a battery operated motor in the handle.

---

This invention relates to a new and useful optical instrument or pleoptoscope employing the Haidinger brush phenomenon.

A primary object of the present invention is to provide a portable and relatively inexpensive instrument useful in connection with the diagnosis and treatment of various eye disorders or abnormalities.

A further object of the present invention is to provide an inexpensive instrument for diagnostic screening of macula disease, testing the presence of central or eccentric fixation, and diagnosing the presence of abnormal retinal correspondence. The instrument is also useful therapeutically for treatment of amblyopia with eccentric fixation at varying distances of fixation.

A still further object of the present invention in accordance with the foregoing objects, is to provide a pleoptoscope which features an adjustable iris diaphragm through which the field of fixation may be varied.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view illustrating the instrument of the present invention.

FIGURE 2 is a longitudinal sectional view through the instrument taken substantially through a plane indicated by section line 2—2 in FIGURE 1.

FIGURE 3 is an enlarged partial sectional view taken substantially through a plane indicated by section line 3—3 in FIGURE 2.

Referring now to the drawings in detail, it will be observed from FIGURE 1 that the instrument or pleoptoscope of the present invention generally referred to by reference numeral 10, includes an opaque tubular housing 12 which is cylindrical in cross-section and a handle assembly 14 which is connected to the housing and extends generally perpendicular thereto. The handle assembly is of a diameter suitable for grasping within the hand and is connected to the housing 12 by means of a tubular connecting member 16 of smaller diameter.

Referring now to FIGURE 3, it will be noted that the tubular housing 12 encloses a cylindrical chamber opened at one axial end. The open end of the housing is closed by a transparent glass wall 18 through which light enters the cylindrical chamber. The opposite axial end of the housing is closed by an opaque conical end wall 20 within which a central viewing aperture 22 is formed covered by a glass disk 24. The viewing aperture is aligned with a central viewing axis 26 which extends longitudinally through the tubular housing 12 so that a person may sight therealong an illuminated object or target at some distance from the instrument.

A polarizing filter disk 28 is rotatably mounted about the viewing axis 26 by means of any suitable bearing assembly 30 axially spaced between the opposite axial ends of the tubular housing. Fixedly mounted between the polarizing disk 28 and the viewing aperture 22, is an annular holder 32 for a stationary blue-violet filter 34, the diameter of the filter 34 being approximately twice the diameter of the viewing aperture 22. It will be apparent therefore to those skilled in the art that upon rotation of the polarizing filter 28, a person of normal vision viewing a relatively bright field of view through the instrument will perceive a pair of rotating bluish brushes of light referred to as the Haidinger brush phenomenon.

In order to vary the extent of the field of vision, an adjustable iris diaphragm device 36 is operatively mounted between the fixedly mounted filter 34 and the viewing aperture 22. Accordingly, the iris aperture 38 may be varied in size by manipulation of the radially projecting iris control 40.

Rotation is imparted to the polarizing filter 28 at approximately 20 r.p.m. when the motor 42 within the handle assembly 14, is energized. Accordingly, the drive shaft 44 which is driven by the motor, extends through the tubular connecting member 16 in perpendicular relation to the viewing axis 26 about which the polarizing disk 28 is rotatably mounted. The drive shaft extends into the housing and is connected therewithin to a drive bevel gear 46 meshing with a driven bevel gear 48 secured to the polarizing disk filter 28 for transmitting drive thereto at the proper drive ratio necessary to impart rotation to the polarizing filter at the speed hereinbefore indicated. It will therefore be apparent that the instrument is set into operation upon actuation of the switch 49 externally mounted on the handle assembly as shown in FIGURE 1. The switch when actuated establishes an electrical connection between the battery source of electrical energy 50 and the motor both of which are mounted within the handle assembly as shown in FIGURE 2.

In using the instrument for testing or diagnosis, the patient looks at a brightly illuminated object or target along the viewing axis 26. When energized, the motor 42 rotates the polarizing filter 28 so that the patient may observe the rotating Haidinger brush phenomenon. Perception of this phenomenon in itself would eliminate from diagnosis one type of eye disorder since the Haidinger brush phenomenon can only be recognized by the fovea of the eye or center of vision. The instrument may also be useful in connection with the diagnosis of central versus eccentric fixation since if the patient can appreciate rotation of the brushes about a point of fixation the patient is said to have central fixation. On the other hand, rotation of the brushes displaced from a point of fixation would indicate eccentric fixation. When combined with other instruments, the pleoptoscope of the present invention may be useful in diagnosing abnormal retinal correspondence.

In order to use the instrument for therapeutic purposes, the patient is seated at various distances from a fixation target or single optotype mounted on a brightly illuminated surface. With the patient's dominant eye patched, the patient is instructed to locate the Haidinger brushes by viewing the target with the other eye through the instrument and attempt to center the brushes about the optotype within the smallest possible field of view. With the aid of the adjustable iris diaphragm, the patient may so attempt to centrally align the rotating brushes about the center of the field of vision and thereby overcome eccentric fixation.

From the foregoing description, it will be appreciated that the instrument of the present invention will be useful because of its versatility and economical construction, both in the home as well as in the office. Further, the instrument will be useful in combination with other instruments as hereinbefore indicated and may also confirm the findings of other more expensive and complicated instruments.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable, self-contained, monocular instrument through which an illuminated target may be viewed externally of the instrument at various distances comprising a tubular housing having a longitudinal axis extending between opposite axial ends, an end wall closing said housing at one of said axial ends having a viewing aperture through which said axis extends, a transparent cover closing the other axial end through which external light enters the housing, a polarizing filter rotatably mounted within the housing about said axis, a light filter fixedly mounted in axial alignment between the polarizing filter and the viewing aperture of a type creating a Heidinger brush phenomenon, a handle assembly connected to the housing for aligning the axis with said target, power operated means mounted within the handle assembly and drivingly connected to the polarizing filter for rotation thereof to establish a rotating Haidinger brush phenomenon, and adjustable iris means mounted within the housing between the viewing aperture and the fixedly mounted filter for varying the monocular field of vision perceived through the instrument along said axis.

2. The combination of claim 1 wherein said power operated means comprises a motor, a battery source of electrical energy connected to said motor for energization thereof and a drive shaft extending from said motor into the housing in perpendicular relation to said axis.

3. The combination of claim 2 wherein said fixedly mounted light filter is of the blue-violet type.

4. The combination of claim 3 wherein said end wall is conical in shape converging toward said viewing aperture which is approximately one-half the diameter of the fixedly mounted filter.

5. The combination of claim 1 wherein said fixedly mounted light filter is of the blue-violet type.

6. The combination of claim 5 wherein said end wall is conical in shape converging toward said viewing aperture which is approximately one-half the diameter of the fixedly mounted filter.

7. The combination of claim 1 wherein said end wall is conical in shape converging toward said viewing aperture which is approximately one-half the diameter of the fixedly mounted filter.

References Cited

UNITED STATES PATENTS

| | | | |
|---|---|---|---|
| 2,388,858 | 11/1945 | MacNeille et al. | 128—76.5 X |
| 2,741,245 | 4/1956 | Lange | 128—76.5 |
| 3,131,695 | 5/1964 | Keeler | 128—395 |
| 2,200,595 | 5/1940 | Diggins | 351—17 |
| 2,495,263 | 1/1950 | Korb | 351—17 |
| 2,855,821 | 10/1958 | Cüppers et al. | 351—32 X |
| 3,044,348 | 7/1962 | Cueppers et al. | 351—3 |

RICHARD A. GAUDET, Primary Examiner

JOHN D. YASKO, Assistant Examiner

U.S. Cl. X.R.

351—25